J. D. NORTH.
CONTROL DEVICE FOR AIRCRAFT.
APPLICATION FILED MAR. 25, 1919.

1,318,171.

Patented Oct. 7, 1919.
5 SHEETS—SHEET 1.

J. D. NORTH.
CONTROL DEVICE FOR AIRCRAFT.
APPLICATION FILED MAR. 25, 1919.

1,318,171.

Patented Oct. 7, 1919.
5 SHEETS—SHEET 3.

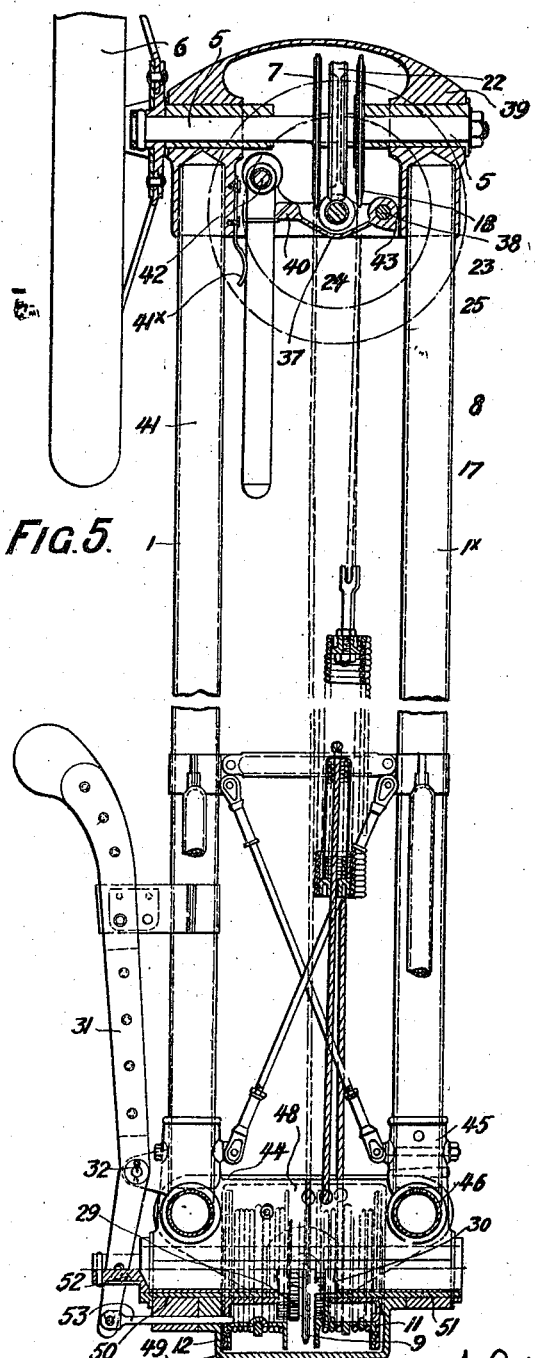

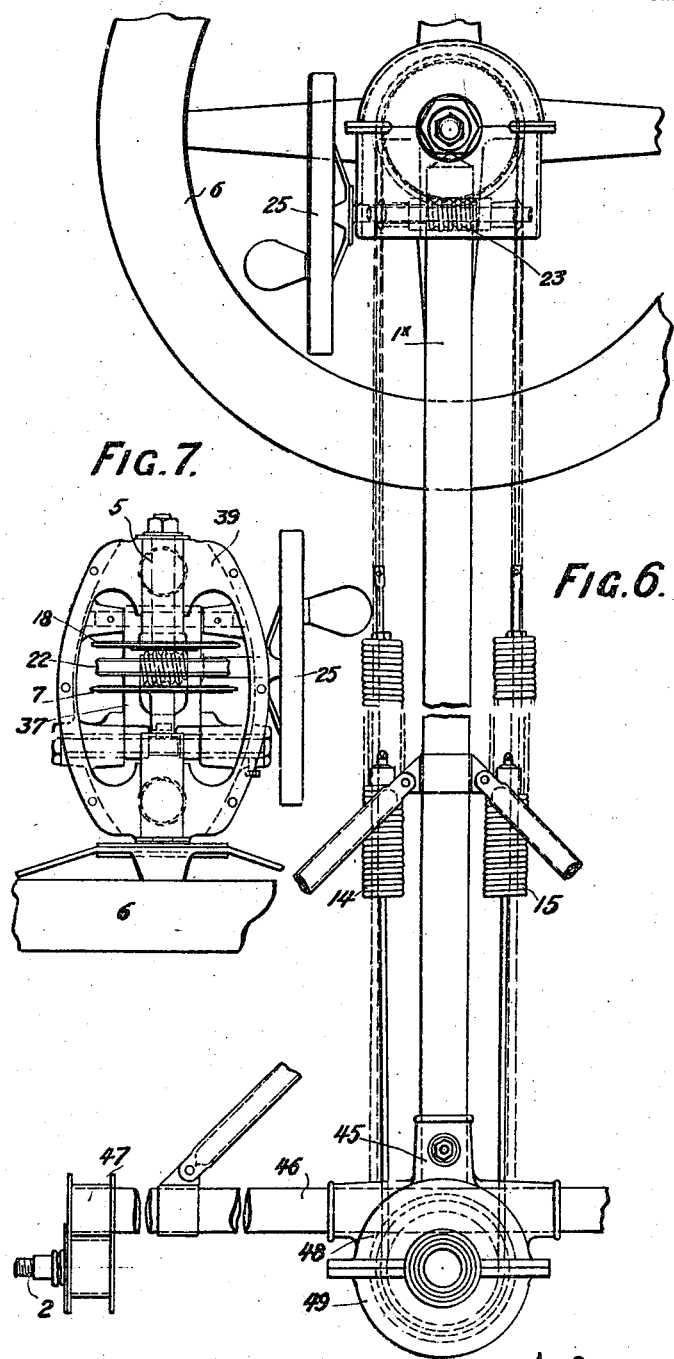

UNITED STATES PATENT OFFICE.

JOHN DUDLEY NORTH, OF BURGH APTON, ENGLAND, ASSIGNOR OF ONE-HALF TO BOULTON & PAUL LIMITED, OF NORWICH, NORFOLK, ENGLAND.

CONTROL DEVICE FOR AIRCRAFT.

1,318,171. Specification of Letters Patent. Patented Oct. 7, 1919.

Application filed March 25, 1919. Serial No. 284,970.

*To all whom it may concern:*

Be it known that I, JOHN DUDLEY NORTH, a subject of the King of Great Britain, residing at Burgh Apton, Norfolk, England, have invented certain new and useful Improvements in Control Devices for Aircraft, of which the following is a specification.

For controlling aeroplane flying machines a control stick is employed which, as is well known, is manipulated to adjust the position of the ailerons, wing flaps or equivalent members, hereafter termed ailerons, for controlling the lateral balance of the machine and also the said control stick is utilized for adjusting the elevators to regulate the angle of incidence of the machine, while the vertical rudder or similar element, hereafter termed rudder, for determining the lateral direction of the machine is commonly operated by a rudder bar or foot-operated mechanism hereafter termed the rudder bar.

The present invention particularly refers to such controlling mechanism in which the control stick is capable of being rocked in a fore and aft direction about an axis transversely of the machine for the purpose of operating the elevators, and carries at its upper end a control wheel revoluble about an axis extending at right angles to the axis about which the control stick can be rocked, the control wheel being connected by flexible connections to operate the ailerons.

Now the object of the present invention is, in connection with such mechanism, to provide means whereby the controlling devices of the machine, that is, the elevators, the ailerons, and the rudder, can be operated in the usual manner as above stated, but by which also when so desired the machine may be trimmed to hold a predetermined course and the pilot thus relieved of maintaining the desired course by a persistent effort on the direction control mechanism, that is, to enable the pilot by a simple adjustment of the operating mechanism of the controls, to lock the ailerons in a desired position of adjustment and to resiliently hold the rudder in any desired position in which it may have been set by the pilot to maintain a desired performance of the machine, while also permitting the pilot from time to time, as may be required, to adjust the position of the rudder by mechanism which will resiliently and automatically hold the rudder in whatever angular position it has been set.

According to the present invention the control wheel is interconnected to the rudder by a clutch mechanism, by means of which the operation of the rudder may be effected by rotation of the control wheel, in which case the ailerons are no longer operated by the control wheel, but become positively and automatically locked in whatever position they may have been set by another clutch mechanism. The trimming of the machine, that is the setting of the rudder in the required angular position, and the maintenance of the rudder in such position without calling for further effort or attention of the pilot until a resetting is required, is carried out by providing a further mechanism on the control stick involving a worm or other irreversible hand-operated gear which can be instantly thrown into or out of operation as required, and whereby when thrown into operation the rudder can be held over at the required angle through the proper tensioning of helical springs connected to the rudder bar by flexible connections which are secondary or auxiliary to the usual flexible connections which extend from the rudder bar to the rudder.

The invention will be described with reference to two examples of construction shown upon the accompanying drawings. The first construction is shown at Figures 1 to 4.

Figs. 5 to 7 show the second and preferred construction of the same apparatus, Fig. 5 and Fig. 6 being respectively side and rear elevations corresponding to Figs. 1 and 2. Fig. 7 is a plan view of the upper part of the apparatus, a cover being removed in order to show the interior arrangement.

Figure 1:
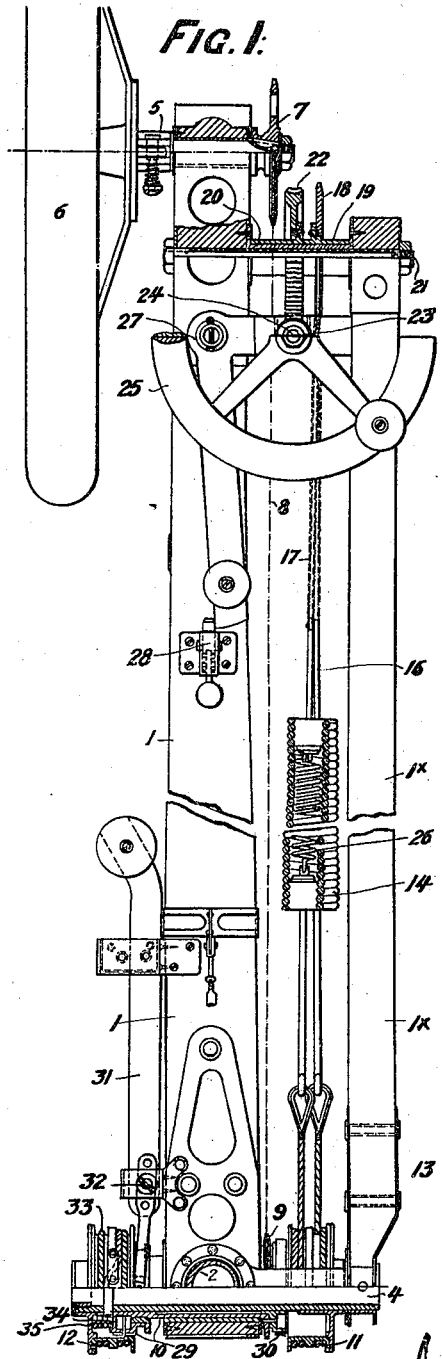
Fig. 1 is a sectional side elevation showing the control stick and the parts relating thereto.
Figure 2:
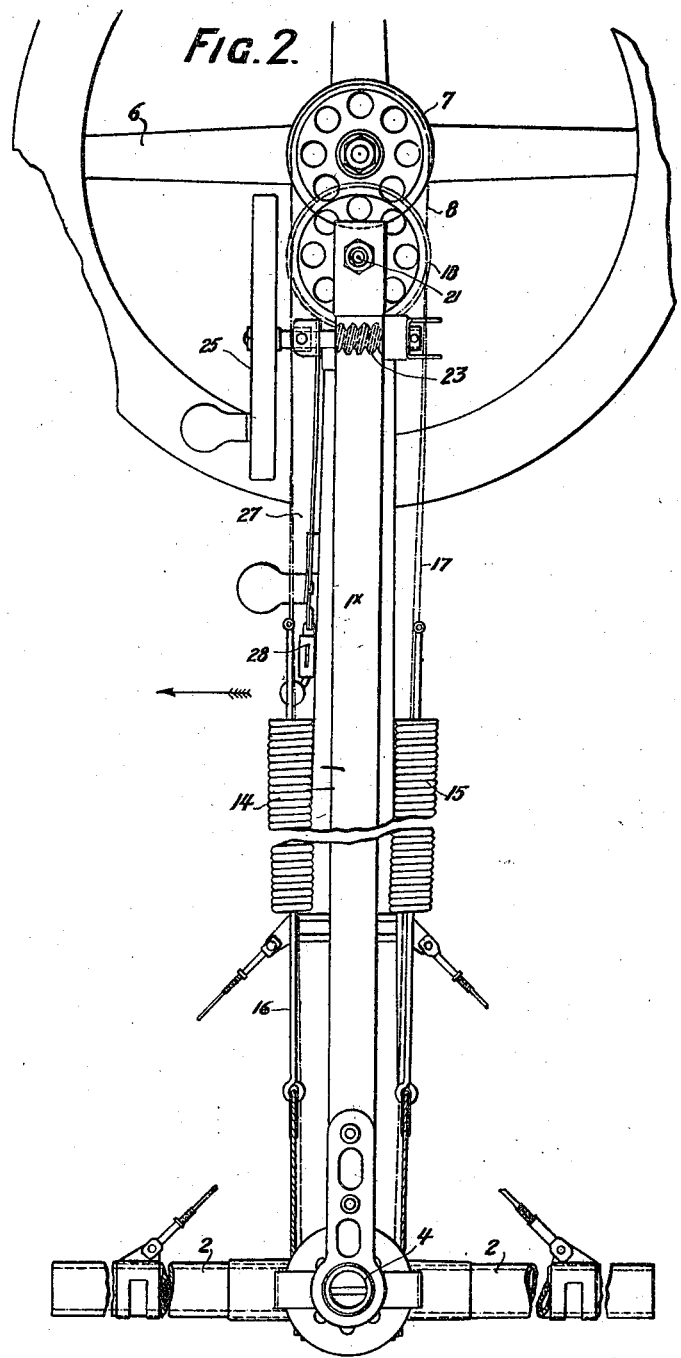
Fig. 2 is a rear elevation of Fig. 1, portions in both figures being broken away in order to reduce the height occupied by the drawing.
Figure 3:
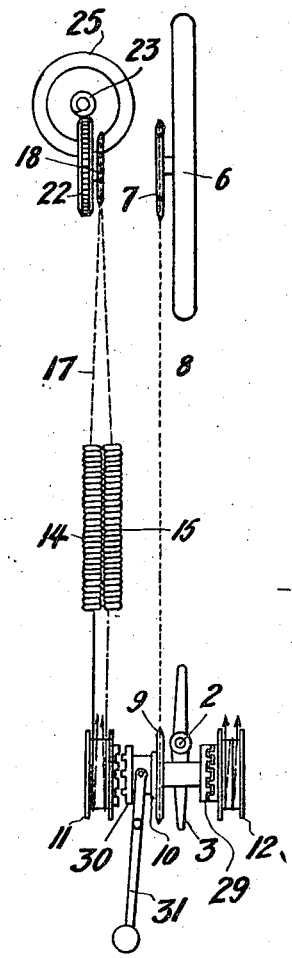
Fig. 3 shows a diagram side elevation, and Fig. 4 a diagram rear elevation, shown in order to explain hereafter the general arrangement and operation.
Figure 4:
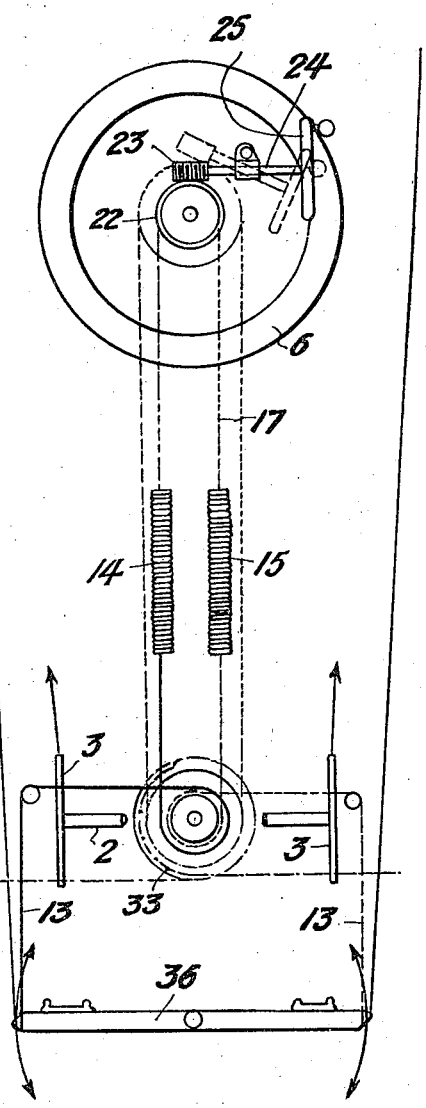

Referring to Figs. 1 and 2 of the accompanying drawings, the control stick in the construction shown is composed of a main vertical front member 1 and a rear auxiliary member $1^x$ parallel thereto, both members 1, $1^x$ at their lower ends being in fixed connection with a shaft 2 extending transversely of the machine and carried in suitable bearings as usual, so that the control stick 1, 1ˣ can be rocked with said shaft 2 (hereafter termed the elevator shaft) in the fore and aft direction of the machine; the elevator shaft 2 is fitted near each end with a lever as usual, sufficiently indicated at 3 in the diagram, Figs. 3 and 4, hereafter referred to, which levers 3 are connected with the elevators so that the fore and aft rocking motion of the control stick 1, 1ˣ operates the elevators.

Through the lower end of the control stick at right angles to the axis of the elevator shaft 2 and preferably in the same plane therewith, there passes what I shall call a fixed spindle 4, that is a spindle fixed to the control stick 1, 1ˣ and extending in the fore and aft direction of the machine and consequently rocking with the control stick about the axis of the shaft 2.

The control wheel shaft 5 is carried in bearings on the upper end of the front member 1 and carries on one end, the control wheel 6, the wheel shaft 5 being parallel with the axis of the fixed spindle 4; the wheel shaft 5 has fixed upon it a sprocket wheel 7 connected by an endless chain, indicated at 8, with a sprocket wheel 9 fixed on a sleeve 10 revoluble on the fixed spindle 4 and capable of endway motion thereon.

On the fixed spindle 4 near one end of the revoluble sleeve 10 is freely mounted a drum 11, hereafter termed the rudder drum, and upon the other end of the said fixed spindle 4 near the opposite end of the sleeve 10 is freely mounted a second drum 12, hereafter termed the aileron drum.

Auxiliary cables 13 pass from the rudder bar (which is normally foot-operated and which is also connected to the rudder in the usual manner, all as hereafter explained with reference to Fig. 4) around the rudder drum 11 in opposite directions, passing upward, see Fig. 1, adjacent to the control stick 1, 1ˣ, and have their ends respectively connected to two coil springs 14, 15, the coil springs being themselves connected respectively to rods 16, the upper end of which latter are connected to the ends of a chain 17 passing over a sprocket wheel 18 fixed on a shaft 19 parallel with the axis of the control wheel shaft and arranged generally slightly below the same, this shaft 19 being termed the auxiliary rudder control shaft; the shaft 19 is tubular and is revolubly carried upon a bearing sleeve 20 carried by a bolt 21 connecting the front and rear members 1, 1ˣ of the control stick.

The rudder control shaft 19 also has fixed to it a worm wheel 22 which can be engaged by a worm 23 carried by a shaft 24 operated by a hand wheel 25, so that when the rudder drum is free to revolve and the worm 23 is in engagement with the worm wheel 22, the pilot may then, by turning the hand operable shaft 24, revolve the auxiliary rudder control shaft 19 and so set or trim the rudder, and so long as the worm 23 on the worm shaft 24 is in engagement with the worm wheel 22 on the control shaft 19, the rudder will be held resiliently in the position in which it has been set; in effecting the setting of the rudder by this hand operable worm shaft 24, it will be understood that a tension is put on one or other of the coil springs 14 or 15, which tension is transmitted to one or other of the auxiliary rudder cables 13, Fig. 4, extending over the rudder cable drum 11, and since the tensioning of one spring slackens the cable attached to the opposite spring, such slack can be taken up by a light coil spring 26.

The worm control shaft 24 by which the rudder can be so set and held at the required angle, is carried at one end in a bearing pivotally mounted on one arm 27 of a two-armed lever fulcrumed on the control stick member 1, the second arm of the lever 27 being fitted with a handle by which it can be rocked, and a spring bolt 28 is fixed on the control stick member 1 by which the lever is retained in position with the worm 23 in gear with the worm wheel 22, and the worm 23 can be thrown out of gear by pulling the bolt 28 downward and permitting the lever 27 to rock on its fulcrum.

Reverting to the sleeve 10 upon the fixed spindle 4, the said sleeve 10 is formed at both ends with clutch parts at 29 and 30, and the two drums 11 and 12 are also formed with corresponding clutch parts; the sleeve 10 is connected to a suitable operating lever 31 pivotally mounted at 32 on the control stick member 1, one arm of the lever engaging between collars on the end of the sleeve 10, so that by operating the lever 31 the sleeve 10 can be slid in either direction so that its clutch parts may engage either the rudder drum 11 or the aileron drum 12.

Cable connections 33 pass around the aileron drum 12 and extend to the ailerons, so that the latter are operated in accordance with the direction of rotation given to the aileron drum 12 through the medium of the control wheel 6, sprocket wheel 7, chain 8 and sprocket wheel 9 on the sleeve 10 assuming the clutch 29 of the sleeve 10 is in engagement with the aileron drum 12.

Within the aileron drum 12 and upon the fixed spindle 4 is mounted a sliding clutch member 34 capable of endway motion but not of rotary motion upon the spindle 4 and a spring 35 is fitted to impel the clutch member 34 in such direction that when freed it will engage the clutch parts on the aileron drum and lock the aileron drum 12 to the spindle.

When the sliding sleeve 10 on the fixed spindle 4 is slid by its operating lever 31 in such a direction as to free the rudder drum 11 so as to leave it for instance, controlled through the coil springs 14, 15 and by the hand-operated worm gear as previously described, the opposite end of the sliding sleeve 10, that is the end adjacent to the aileron drum 12, pushes the sliding clutch 34 in the aileron drum 12 out of operation, that is out of engagement with the aileron drum, and immediately the aileron drum 12 is engaged by the clutch part 29 on the sliding sleeve 10, in which position the ailerons are operable through the control wheel 6 and the aileron drum 12.

On the other hand when the sleeve 10 is slid endwise with its clutch part 30 into engagement with the rudder drum 11, the aileron drum 12 becomes immediately locked to the fixed spindle 4 by its interior sliding clutch member 34, and in this position the ailerons are fixed.

A proper understanding of the working of the invention will be assisted by reference to the diagrams Figs. 3 and 4.

When the clutch part 29 of the sliding sleeve is brought into engagement with the aileron drum 12, the ailerons can be operated by the control wheel 6 through the medium of the endless chain 8 extending over the sprocket wheel 9 carried by the sliding sleeve 10, and provided the hand operable worm shaft 24 is out of engagement with the worm wheel 22 on the auxiliary rudder control shaft, the rudder can then be controlled by the foot-operated rudder bar 36, Fig. 4, as usual. When it is desired that the rudder should be interconnected with the hand operable worm shaft 24, the latter is then thrown into gear with the worm wheel 22, whereby the rudder is resiliently held in the position in which it has been set, or to which it has been adjusted by the rotation of the worm shaft 24.

When the sliding sleeve 10 is slid so as to engage with the rudder drum 11, the aileron drum 12 immediately becomes locked against revolution, and the ailerons are retained in the position in which they have been set, while the control wheel 6 can be used to rock the rudder slightly in one direction or the other, and when the hand operable worm shaft 24 is in gear with the worm wheel 22, the rudder can be trimmed so as to be resiliently held at about any desired angle without effort on the part of the pilot.

By this means it will now be understood that the fore and aft rocking motion given to the control stick about the axis of the shaft 2, operates the elevators as usual, and assuming that the clutch-carrying sleeve 10 is slid so that it engages the aileron drum 12 (thereby freeing said drum from the fixed spindle 4) then the ailerons can be operated directly by the control wheel 6 as usual, and the rudder can be operated by the usual rudder bar 36, as shown in the diagram Fig. 4.

The machine having been trimmed, then the ailerons can be locked by sliding the clutch-carrying sleeve 10 into engagement with the rudder drum 11, thereby causing the aileron drum 12 to be locked to the fixed spindle 4, and assuming that the worm 23 is not in engagement with the worm wheel 22, still leaving the rudder free to be operated by the rudder bar 36 as usual.

By throwing the worm 23 into engagement with the worm wheel 22, the rudder can be held in the desired angular position in which it is set, it being capable of such angular deviation from such position on either side owing to the resilience of the springs 14 and 15, and in this position, by the control wheel 6, the position of the rudder can be given limited adjustment on either side of the said position in which it has been set.

The arrangement shown at Figs. 5 to 7 will now be described, those parts of the construction which correspond to Figs. 1 and 2 being referred to by similar reference numerals.

In this construction, as will be seen by reference to Figs. 5 and 7 the separate worm wheel shaft 19 is dispensed with, and instead the control wheel shaft 5 is utilized to carry the sprocket wheel 18 and the worm wheel 22 which are connected by a sleeve $18^x$ freely revoluble on the shaft 5. The worm shaft 24 carrying the worm 23 is in this case mounted in bearings in a rocking frame 37, one end of which frame is fulcrumed on a pivot 38 carried by the head framing 39 of the control stick, and the opposite or forward end of the rocking frame 37 is formed with a lip 40, which, when the worm 23 is in gear with the worm wheel 22 as shown at Fig. 5, is supported by a projection on a hand lever 41 which is pivoted at 42, and when the rocking frame is freed from the projection of the lever 41 by the rocking of the latter, the rocking frame 37 turns about the pivot 38 through an angle limited by a projection 43 on the rocking frame contacting with the head frame 39, the motion of the rocking frame being sufficient to disengage the worm 23 from the worm wheel 22.

When it is desired to put the worm 23 again in engagement with the worm wheel 22, this can be easily effected by raising the frame 37 about its pivot 38 by means of the hand wheel 25 by which the worm is operated; the lip 40 of the rocking frame 37 causing the lever 41 to rock on its pivot 42 against the action of a spring $41^x$, the lever 41 immediately returning and retaining the rocking frame in position.

In this construction the front member 1 and the rear member 1ˣ composing the control stick are connected at their lower ends to a bottom bracket 44 fitting into sockets 45, the bracket 44, see Fig. 6, having lateral sockets to receive transverse shafts 46 fixed to the bracket, said shafts 46 carrying at their ends, end brackets 47 from which shafts 2 extend which are carried in suitable bearings and upon which shafts 2 the structure of the control stick rocks in the fore and aft direction of the machine in order to operate the elevators by means say of levers fixed on the shaft 2 and as previously described with reference to the diagram Fig. 4.

The bracket 44 is formed with a casing 48 having a lower cover 49 to contain the aileron drum 12 and the rudder drum 11. The aileron drum 12 is freely mounted on a fixed sleeve 50 carried by the bracket 44, and the rudder drum 11 is also freely mounted on a fixed sleeve 51 carried from the other side of the bracket 44, see Fig. 5.

The endwise movable tubular shaft 52 extends through the sleeves 50 and 51 and also extends freely through a short sleeve carrying centrally the sprocket wheel 9, and upon each side of the sprocket wheel the short sleeve carries or is formed with clutch members 29, 30. The short sleeve carrying the sprocket wheel 9 and the clutch members 29 and 30 is free to revolve upon the tubular shaft 52 but is not free to have endway motion thereon. One end of the sliding tubular shaft 52 is connected by a pin with one arm of the operating lever 31, by which latter lever the tubular shaft 52 can be slid to cause the clutches 29 and 30 to coact with one or other of the clutch members either of the aileron drum 12 or of the rudder drum 11, so that by operating the lever 31 either the aileron drum 12 can be locked to the sprocket wheel 9, or the rudder drum 11 can be locked to the sprocket wheel 9.

The lower end of the operating lever 31 is fitted with a pin 53 passing through a bore in the bracket 44, the end of the pin being capable of entering any one of a series of holes formed in the aileron drum 12, and the length of the pin is such that when the clutch member 30 is engaged with the rudder drum 11, the pin 53 will lock the aileron drum 12 against rotation. Correspondingly when, by the movement of the operating lever 31, the locking pin 53 is withdrawn from the aileron drum 12, the latter drum will be engaged by the clutch member 29 due to the corresponding sliding movement of the tubular shaft 52.

The operation of the mechanism is precisely similar to that previously described. In the position shown at Figs. 5 and 6 the elevators are free to be operated as usual by the fore and aft rocking movement of the control stick about the axis of the shaft 2.

In utilizing the apparatus described, the rudder can be set in any desired angular position by means of the rudder bar 36 as is usually practised, prior to the worm 23 being placed in engagement with the worm wheel 22. This having been accomplished, the worm 23 is placed in engagement with the worm wheel 22 by lifting the hand wheel 25 and is retained in such engagement by the lip 40 being engaged by the projection on the lever 41. The lever 31 is operated so as to place the clutch member 30 in engagement with the rudder drum 11 in which position it is shown at Fig. 5 and the aileron drum by the same operation is locked by the locking pin 53 as it is shown in the drawing.

With the mechanism thus set, the hand control wheel 6 can be employed to adjust the rudder through a limited angle from one side to the other of the position in which it has been set, this being effected by rocking the hand control shaft 5, and through the medium of the sprocket wheel 7 thereon, the chain 8 and sprocket wheel 9, rocking the rudder drum against the action of the springs 14, 15.

By rocking the operating lever 31 the locking pin 53 will be withdrawn from the aileron drum 12 while simultaneously the clutch sleeve will be engaged with the aileron drum, and immediately the ailerons can be operated through the chain 8, sprocket wheel 7, and hand control wheel 6, and by rocking the lever 41 the worm will be disengaged from the worm wheel 22 and immediately the rudder could be operated by the rudder bar as usual.

What I claim as my invention and desire to secure by Letters Patent is:—

1. In controlling mechanism of the kind specified for aeroplane flying machines; the combination of an aileron drum and a rudder drum coaxially arranged, a fixed spindle carried by the lower end of the control stick upon which spindle said drums are revolubly mounted, flexible connections extending around the aileron drum to control the ailerons, auxiliary flexible connections extending around the rudder drum in operative connection with the vertical rudder, a freely revoluble wheel carried in bearings near the upper end of the control stick over which wheel said auxiliary rudder connections pass, springs interposed in said auxiliary rudder connections, a gear of worm character capable of being thrown into connection with said wheel over which said auxiliary rudder connections pass to hold said rudder resiliently in a set position, means for operating said worm gear to adjust said rudder, a hand operated control wheel, means for connecting the aileron drum to the hand-operated control wheel to allow the ailerons to be operated thereby while leaving the rudder drum free, or alternatively locking said aileron drum and thereby locking said ailerons in the position in which they have been set and simultaneously connecting said rudder drum to said hand-operated control wheel to enable said rudder to be rocked against the resilient control exercised by said worm gear when the latter is thrown into operation.

2. In controlling mechanism of the kind specified for aeroplane flying machines; the combination of an aileron drum and a rudder drum coaxially arranged, a fixed spindle carried by the lower end of the control stick upon which spindle said drums are revolubly mounted, flexible connections extending around the aileron drum to control the ailerons, auxiliary flexible connections extending around the rudder drum in operative connection with the vertical rudder, a freely revoluble wheel carried in bearings near the upper end of the control stick over which wheel said auxiliary rudder connections pass, springs interposed in said auxiliary rudder connections, a gear of worm character capable of being thrown into connection with said wheel over which said auxiliary rudder connections pass to hold said rudder resiliently in a set position, means for operating said worm gear to adjust said rudder, a sliding and revoluble clutch member located between said aileron drum and said rudder drum, a hand operated control wheel, means for connecting said clutch member with the shaft of said hand-operated control wheel to enable said clutch member to be revolved thereby, means for operating said clutch member to engage said aileron drum and to leave said rudder drum free or to cause said clutch member to engage said rudder drum and to simultaneously lock said aileron drum against rotation to fix said ailerons and whereby when said worm gear is in operative relation with said wheel over which said rudder connections pass to permit said rudder to be locked by said hand control wheel against the action of said springs from one side to the other of its set position.

3. In controlling mechanism of the kind specified for aeroplane flying machines; the combination of an aileron drum and a rudder drum coaxially arranged, a fixed spindle carried by the lower end of the control stick upon which spindle said drums are revolubly mounted, flexible connections extending around the aileron drum to control the ailerons, auxiliary flexible connections extending around the rudder drum in operative connection with the vertical rudder, a freely revoluble wheel carried in bearings near the upper end of the control stick over which wheel said auxiliary rudder connections pass, springs interposed in said auxiliary rudder connections, a gear of worm character capable of being thrown into connection with said wheel over which said auxiliary rudder connections pass to hold said rudder resiliently in a set position, means for operating said worm gear to adjust said rudder, a sliding and revoluble clutch member located between said aileron drum and said rudder drum, a hand operated control wheel, means for connecting said revoluble clutch member with the shaft of the hand-operated control wheel to enable said clutch member to be revolved thereby, a manually operated lever on said control stick to slide said clutch member to engage the aileron drum and to simultaneously leave the rudder drum free to enable the rudder to be operated by the rudder bar, or to slide said clutch member into engagement with said rudder drum to permit the latter to be operated by said hand-operated wheel, and means to automatically lock said aileron drum against rotation to fix said ailerons when said clutch member is slid to engage said rudder drum and whereby when said worm gear is in operative relation with said wheel over which said rudder connections pass, to permit said rudder to be rocked by said hand control wheel against the action of said springs from one side to the other of its set position.

4. In controlling mechanism of the kind specified for aeroplane flying machines; the combination of an aileron drum and a rudder drum coaxially arranged, a fixed spindle carried by the lower end of the control stick upon which spindle said drums are revolubly mounted, flexible connections extending around the aileron drum to control the ailerons, auxiliary flexible connections extending around the rudder drum in operative connection with the vertical rudder, a freely revoluble wheel carried in bearings near the upper end of the control stick over which wheel said auxiliary rudder connections pass, springs interposed in said auxiliary rudder connections, a gear of worm character capable of being thrown into connection with said wheel over which said auxiliary rudder connections pass to hold said rudder resiliently in a set position, means for operating said worm gear to adjust said rudder, a sliding and revoluble clutch member located between said aileron drum and said rudder drum, a sprocket wheel on said clutch member, a hand operated control wheel, a sprocket wheel on the hand control wheel shaft, and an endless chain passing over said sprocket wheels to enable said clutch member to be revolved by said hand-operated control wheel; a manually operated lever on said control stick to slide said clutch member to engage the aileron drum and to simultaneously leave the rudder drum free to enable the rudder to be operated by the rudder bar, or to slide said clutch member into engagement with said rudder drum to permit the latter to be operated by said hand-operated wheel, and means to automatically lock said aileron drum against rotation to fix said ailerons when said clutch member is slid to engage said rudder drum and whereby when said worm gear is in operative relation with said wheel over which said rudder connections pass, to permit said rudder to be rocked by said hand control wheel against the action of said springs from one side to the other of its set position.

5. In controlling mechanism of the kind specified for aeroplane flying machines; the combination of an aileron drum and a rudder drum coaxially arranged, a fixed spindle carried by the lower end of the control stick upon which spindle said drums are revolubly mounted, flexible connections extending around the aileron drum to control the ailerons, auxiliary flexible connections extending around the rudder drum in operative connection with the vertical rudder, a freely revoluble wheel carried in bearings near the upper end of the control stick over which wheel said auxiliary rudder connections pass, springs interposed in said auxiliary rudder connections, a worm wheel fixed to said freely revoluble wheel over which said auxiliary rudder connections pass, a worm to engage said worm wheel, a shaft to carry said worm, a rocking member having bearings to carry said shaft, a hand lever, and means coacting between said hand lever and said rocking member to retain said worm in engagement with said worm wheel, or by which said rocking member can be released to disengage said worm from said worm wheel, means for operating said worm gear to adjust said rudder, a sliding and revoluble clutch member located between said aileron drum and said rudder drum, a hand operated control wheel, means for connecting said revoluble clutch member with the shaft of the hand-operated control wheel to enable said clutch member to be revolved thereby, a manually operated lever on said control stick to slide said clutch member to engage the aileron drum and to simultaneously leave the rudder drum free to enable the rudder to be operated by the rudder bar, or to slide said clutch member into engagement with said rudder drum to permit the latter to be operated by said hand-operated wheel, and means to automatically lock said aileron drum against rotation to fix ailerons when said clutch member is slid to engage said rudder drum and whereby when said worm gear is in operative relation with said wheel over which said rudder connections pass, to permit said rudder to be rocked by said hand control wheel against the action of said springs from one side to the other of its set position.

6. In controlling mechanism of the kind specified for aeroplane flying machines; the combination of an aileron drum and a rudder drum coaxially arranged, a fixed spindle carried by the lower end of the control stick upon which spindle said drums are revolubly mounted, flexible connections extending around the aileron drum to control the ailerons, auxiliary flexible connections extending around the rudder drum in operative connection with the vertical rudder, a freely revoluble wheel carried in bearings near the upper end of the control stick over which wheel said auxiliary rudder connections pass, springs interposed in said auxiliary rudder connections, a gear of worm character capable of being thrown into connection with said wheel over which said auxiliary rudder connections pass to hold said rudder resiliently in a set position, means for operating said worm gear to adjust said rudder, a sliding and revoluble clutch member located between said aileron drum and said rudder drum, a hand operated control wheel, means for connecting said revoluble clutch member with the shaft of the hand-operated control wheel to enable said clutch member to be revolved thereby, a manually operated lever on said control stick to slide said clutch member to engage the aileron drum and to simultaneously leave the rudder drum free to enable the rudder to be operated by the rudder bar, or to slide said clutch member into engagement with said rudder drum to permit the latter to be operated by said hand-operated wheel, a sliding member carried by said manually operated lever on said control stick to engage with and lock said aileron drum against rotation simultaneously with the movement of said manually operated lever for effecting the sliding of the clutch member from the aileron drum to engagement with the rudder drum.

In witness whereof I have hereunto set my hand in the presence of two witnesses.

JOHN DUDLEY NORTH.

Witnesses:
ARCHIBALD FREDERICK SEMMELL,
HORACE FISHER.